United States Patent Office 3,164,637
Patented Jan. 5, 1965

3,164,637
FLUORO COMPOUND SYNTHESIS
Henry R. Nychka, Randolph Township, Morris County, and Cyril Woolf, Morristown, N.J., assignors to Allied Chemical Corporation, New York, N.Y., a corporation of New York
No Drawing. Filed Sept. 26, 1962, Ser. No. 226,440
7 Claims. (Cl. 260—593)

This invention relates to processes for making hexafluoroacetone, and perchlorofluoroacetones particularly pentafluoromonochloroacetone. These products, of known composition and utility, comprise $C_3OCl_{6-x}F_x$ where $x$ is an integer from 1 to 6 inclusive, and mixtures thereof.

Processes for making the indicated compounds are known. It has been proposed to make hexafluoroacetone by reaction of acetone and elemental fluorine. Disadvantages entailed in the hazardous use of elemental fluorine are obvious. Liquid-phase reactions, involving use of anhydrous HF and pentavalent antimony fluorochloride i.e. HF fluorination of e.g. $CCl_3COCCl_3$, for making perchlorofluoroacetones are known. While such reactions are commercially successful, liquid-phase processes utilizing antimony halides are characterized by recognized disadvantages among which are the corrosiveness of antimony halides, difficulties arising out of the use of liquid-phase reactions as distinguished from a solid catalyst process, and relatively high antimony halides volatility causing gas-line plugging. Completely gas-phase, solid catalyst HF fluorination processes for preparing perchlorofluoroacetones are known. While such processes are notably efficient with regard to synthesis of perchlorofluoroacetones containing 4 or less fluorine atoms per mol, these solid catalyst procedures afford no appreciable production of the higher fluorine compounds, i.e.

$$CF_3COCF_2Cl \text{ and } CF_3COCF_3$$

HF fluorination reactions include formation of reaction zone exits which may contain byproduct HCl and unreacted HF, and hence may present, in large scale work, operational difficulties in the separation and recovery of HF and HCl from the sought-for organic products.

This invention is directed to provision of solid catalyst, all gas-phase processes for making the perfluoro and all of the perchlorofluoroacetones by procedures not involving disadvantages noted above.

In accordance with the invention it has been found that certain anhydrous dichromium trioxide $(Cr_2O_3)$ catalysts, when used under certain reaction conditions, disproportionate perchlorofluoroacetones to other perchlorofluoroacetones and to perfluoroacetone, and to mixtures thereof. It has been found that these dichromium trioxide catalysts possess the properties which effectively disproportionate any one of $C_3OCl_{6-x}F_x$, where $x$ is an integer from 2 to 5 inclusive to other perchlorofluoroacetone and perfluoroacetone products which contain greater and lesser proportions of fluorine than did the initial perchlorofluoroacetones subjected to disproportionation. The invention involves the discovery of the disproportionating properties of the herein $Cr_2O_3$ catalysts, and also the reaction conditions which, conjunctively with the catalysts, accomplish the stated objectives.

It is important that the organic starting materials used in practice of the invention contain no hydrogen. Presence of hydrogen in a starting material not only results in production of substantially none of the herein sought-for products but also causes vigorous starting material decomposition with formation of numerous unwanted compounds such as phosgene, carbon monoxide, halogenated methane derivatives, and resinous tars. Thus, starting materials employed herein contain no hydrogen, and are referred to as perhalogenated acetones.

In broader aspects of the invention, the starting materials comprise perhalogenated acetones containing two to five fluorine atoms and wherein all halogens are selected from the group consisting of chlorine and fluorine. In certain preferred embodiments, i.e. those directed primarily to manufacture of $$CF_3COCF_3 \text{ and } CF_3COCF_2Cl$$

the prefered starting materials comprise perhalogenated acetones containing two to four, preferably three to four fluorine atoms and wherein all halogens are of the group consisting of chlorine and fluorine. Aside from perchlorofluoroacetones which may, for example, constitute recycled feed stock, the commercially important source most adaptable for use as starting material is the symmetrical $CF_2ClCOCF_2Cl$. Hence, suitable starting materials include—

Sym-Difluorotetrachloroacetone—$CFCl_2COCFCl_2$—B.P. 118–122° C.
Asym-difluorotetrachloroacetone — $CF_2ClCOCCl_3$—B.P. about 120° C.
Trifluorotrichloroacetone — $CCl_2FCOCClF_2$—B.P. about 84° C.
Asym - trifluorotrichloroacetone — $CF_3COCCl_3$ — B.P. about 84° C.
Sym-tetrafluorodichloroacetone — $CClF_2COCClF_2$—B.P. about 44° C.
Asym-tetrafluorodichloroacetone — $CF_3COCCl_2F$—B.P. about 44° C.
Pentafluoromonochloracetone — $CF_3COCClF_2$—B.P. 7–11° C.

and any mixtures of two or more of any of the foregoing. In practice of the better embodiments, it is usually preferred to feed to the reaction a mixture of unreacted or lower fllorine content recycle and incoming $$CF_2ClCOCF_2Cl$$

e.g. mixtures containing 25 to 75 weight percent of $$CF_2ClCOCF_2Cl$$

balance, recycle stock.

Reaction-wise, the invention process may be exemplified by $$2C_3OF_4Cl_2 \rightarrow C_3OF_5Cl + C_3OF_3Cl_3$$

Reaction is such that the disproportionation of two molecules of a given perchlorofluoroacetone produces one molecule each of two other perhalogenated acetones, one containing one more fluorine atom than the starting perchlorofluoroacetone, while the other contains one less fluorine atom. The following illustrates diagrammatically symmetric tetrafluorodichloroacetone disproportionation in the course of which there is formed hexafluoroacetone down to difluorotetrachloroacetone:

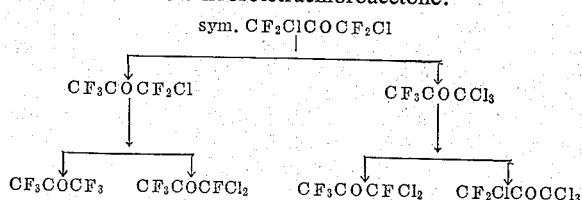

Similarly, it will be understood that, in addition to the above, difluorotetrachloroacetones may be disproportionated to monofluoropentachloroacetone and trifluorotrichloroacetones; $CF_2ClCOCFCl_2$ to difluorotetrachloroacetones and tetrafluorodichloroacetones; $CF_3COCFCl_2$ to trifluorotrichloroacetones and pentafluoromonochloroacetone. Products of disproportionation form dominantly, usually more than 65–75%, as the asymmetric isomers in instances where either isomer is possible.

The disproportionating catalysts employed in practice of the invention are anhydrous dichromium trioxides ($Cr_2O_3$). The catalysts are those made by certain heat treatment of hydrous chromic oxides which in turn are derived as precipitates from aqueous solutions of trivalent chrominum salts such as chromium nitrate, chloride, and sulfate. While precipitation of hydrous chromic oxides may be effected by means of addition to the chromic salt solutions of bases such as NaOH and KOH, the preferred catalysts are those derived from hydrous chromic oxides precipitated out of an aqueous solution of a trivalent chromium salt by means of ammonia used e.g. as ammonia gas or as $NH_4OH$. A satisfactory method for making such a hydrous oxide includes adding an aqueous solution of ammonia to a heated aqueous solution of a trivalent chromium salt, preferably the nitrate

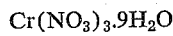

$$Cr(NO_3)_3 \cdot 9H_2O$$

until the aqueous solution is approximately neutral, about pH 7. The resulting solution may be boiled for a few minutes and filtered while hot to facilitate filtration. The hydrous chromic oxide precipitate recovered on filtration may be hot water-washed to leach out ammonium nitrate and any other water-soluble impurities. Hydrous $Cr_2O_3$ thus obtained may be then converted to the $Cr_2O_3$ catalysts of the invention by heat treatment at elevated temperatures not higher than about 400° C. Preliminary drying may be effected in any suitable way such as by heating under vacuum or in an inert gas stream, or by heating in any equipment provided with facilities for steam escape. In one of the better embodiments of catalyst preparation, the hydrous chromic oxide is dried at temperatures of about 100–200° C. to remove the major portion of combined water, and the partially dehydrated oxide is then granulated to about 4 to 20 mesh, or pressed to pellets e.g. 1/8″ diameter and 3/8″ long. The sized material is then subjected to heat treatment for a substantial period of time at temperature in the range of about 300–400° C.

In all embodiments of the invention in which the catalyst employed has been made by precipitation from an aqueous solution of a trivalent chromium salt, and particularly when ammonia precipitated, it is preferred to subject the chromic oxide material to heat treatment, in a suitable vented heating chamber, i.e. in an atmosphere consisting of water vapor and possibly an inert gas, at temperature in the range of substantially 300–400° C. for at least about one hour preferably for at least two hours and for a period in the range of about two to four hours and and until after the exit of the heat treater contains no water. The heat treatment noted, in addition to accomplishing an unusually thorough degree of dehydration, imparts to the catalytic material the properties to which are attributable the disproportionating characteristics demonstrated herein.

Although not preferred, the dichromium trioxide catalysts may be used in supported form, i.e. supported on inert refractory material such as silica, fused alumina (Alumdum) chips, or calcium or magnesium fluoride. Catalyst in supported form may be prepared by soaking fused alumina 4–8 mesh chips in a saturated solution of chromic nitrate, filtering, drying, and heat-treating at 300–400° C., as above. Alternatively, supported catalyst may be made by coprecipitating chromic hydroxide and a refractory material such as calcium or magnesium fluoride and, after filtering subjecting the same to drying and heat treatment as above. In the making of supported catalysts, which consist of $Cr_2O_3$ plus a support, proportioning of reactants may be such that the catalytic materials contain 1–60% preferably 2–45% by weight of $Cr_2O_3$.

The catalytically active materials employed consist of the described anhydrous dichromium trioxides which may be carried by an inert support. Preferably the catalysts are used in unsupport but sized form, i.e. in granular or pelleted form. The preferred catalysts are characterized by having been formed from hydrous chromic oxides derived by ammonia precipitation from a trivalent chromium salt solution, preferably the nitrate, and subsequent subjection to the 300–400° C. heat treatment described. Such catalysts are substantially amorphous, and have a crystalline size, as determined by X-ray diffraction. A further characteristic of the ammonia precipitated-heat treated unsupported $Cr_2O_3$ catalysts of the invention is relatively high surface area. Generally, the surface area is at least 5 m.²/g. and usually is greater than 50 m.²/g. The method for determining surface area was the standard nitrogen adsorption method as described by Emmett and Brunauer, Journal American Chemical Society, vol. 56, 35 (1934), and method of calculation was that of Harkins and Jura, Journal American Chemical Society, vol. 66, 1366 (1944).

Any suitable chamber or reactor tube equipped for metered introduction of vaporous organic and constructed of inert material may be employed for carrying out the reaction provided the reaction zone is of sufficient length and cross-sectional area to accommodate the required amount of catalyst necessary to provide adequate gas contact area and at the same time afford sufficient free space for passage of the gas mixture at an economical rate of flow. Materials such as nickel, graphite, Inconel and other materials resistant to HF may be suitable for reactor tubes. Externally disposed reactor heating means such as automatically controlled electrical resistance heaters may be used for heating purposes.

Generally, the invention process is carried out by contacting vapor phase starting material with the catalyst at temperature at which disproportionation takes place. Operations may be suitably carried out by introducing, into a reaction zone containing the catalyst, a charge consisting of vapor phase starting material containing at least one and usually a mixture of the indicated perchlorofluoroacetones, and heating the material in the zone at indicated temperatures for a time sufficient to convert an appreciable amount of organic halogenated material fed to a reaction product containing at least one perfluoro or perchlorofluoroacetone having a higher fluorine content than any perhalogenated acetone fed, withdrawing gaseous reaction products from the zone, and recovering fluorinated material from the gaseous products. Atmospheric pressure operation is preferred but the reaction may, if desired, be carried out at superatmospheric or subatmospheric pressure.

Reaction temperatures may be maintained at or above those at which disproportionation of the particular starting compound begins to take place in the presence of the solid $Cr_2O_3$. Some disproportionation may be noted at temperature as low as about 200° C. However, reaction proceeds more satisfactorily at temperatures upwardly of about 225° C. Disproportionation proceeds and formation of products may be effected at temperature as high as about 500° C., although to guard against decomposition, particularly when making substantial amounts of $CF_3COCF_3$, temperatures higher than about 400° C. are not desirable. Temperature variations within the general range of 225–400° C. regulate the relative amounts of products formed, and hence such temperatures are adjusted in accordance with whatever dominant product is desired. Hence, in the better embodiments, preferred temperatures are substantially in the range of 225–400° C.

Contact time of reactants with catalyst may range considerably. In general, low contact time tends toward formation of lower fluorine content products, and higher contact time toward the high fluorine compounds. Contact time may vary from one to 75 or more seconds. However, substantial contact time is desirable. Contact time ordinarily is not less than about 10 seconds, and preferably in the range of 10–50 seconds. In a particular operation, the rate of flow of reactants in the reaction zone is dependent upon variables such as scale of operation, quantity of catalyst in the reactor, organic starting material used, temperature, product made, and specific apparatus employed. For a given operation, dependent upon the foregoing variables and particularly on the product desired, optimum conditions as to temperature and contact time may be best determined by test runs.

Products which may be made in accordance with the invention include the eight above identified percholrofluoroacetones and hexafluoroacetone, $CF_3COCF_3$, B.P. about minus 26° C. Product recovery may be conventional. Products in the gas stream exiting the reaction zone may be recovered in any suitable manner as by condensation and subsequent fractional distillation. A substantial operating advantage afforded by the invention is that the reaction zone exit contains nothing but organics, i.e. contains no HF or HCl. Accordingly, product recovery is greatly simplified, and involves only condensation and subsequent fractional distillation. Thus, the gaseous product may be condensed in a vsesel maintained at a temperature substantially below the boiling point of the lowest boiling material present, e.g. by indirect cooling of the gas by an acetone-Dry Ice bath. The particular products recovered depend, as indicated above, upon starting material and reaction conditions. Identity and amounts of product in the reactor exit gas stream may be determined by fractional distillation and/or conventional infrared analytical technique. Substantially pure product may be recovered by distillation of condensates obtained above, and unreacted halogenated compound starting material or other unwanted compounds may be recycled to subsequent operation.

The following examples illustrate practice of the invention. Weight percent yields are on the basis of starting material fed, i.e. weight of product divided by weight of starting material fed multiplied by 100. The dichromium trioxide catalyst employed in all runs was prepared by adding about 530 g. of commercial grade high purity $Cr(NO_3)_3 \cdot 9H_2O$ and 500 g. of 28% aqueous $NH_4OH$ with stirring to 2000 ml. of water heated to about 90° C. The resulting precipitated hydrous chromic oxide was filtered, water-washed, preliminarily dried by heating to about 125° C. and pelleted to about 1/8″ x 3/8″ size. These pellets (about 400 cc.) were charged into a 1″ I.D. by 36″ long nickel reactor mounted in an electrically heated furnace equipped with means for maintaining in the reactor the temperatures stated. The inlet end of the reactor was provided with facilities for metered introduction of vaporous reactants, and the outlet end of the reactor was connected to the inlet end of a product recovery system. For completion of preparation of the catalyst, prior to use of the same in the following runs, the pellets in the reactor were subjected to suitably vented heat treatment at temperature in the range of 370–400° C. for about 4 hours and until after the heater exit contained no water, to bring about completion of dehydration and to effectuate the property changes to which the disproportionating properties of the $Cr_2O_3$ catalyst are attributable.

*Example 1.*—Apparatus employed included the above reactor packed with about 389 g. of catalyst made as above described. Temperature in the reactor throughout the run varied within the range of about 327–340° C. During a period of about 1.2 hrs., about 379 g. (1.9 m.) of a feed consisting of vaporous $CF_2ClCOCF_2Cl$ was metered into the reactor at a rate of about 315 g. (1.58 m.) per hour. Charging of the organic feed was such that contact time in the reactor was about 19 seconds. The reactor effluent was totally condensed in a Dry Ice-acetone trap, and about 360 g. of organic material were collected. The trap condensate was fractionally distilled, and weight composition of the organic products recovered was about as follows. Products were identified by boiling point determinations and infrared analyses:

| Fraction | B.P., °C. Range | Constituent | Percent Yield |
|---|---|---|---|
| I | −23 to −22 | $CF_3COCF_3$ | 12.2 |
| II | 4–10 | $CF_3COCF_2Cl$ | 25.5 |
| III | 43–50 | $CF_3COCFCl_2$ | 20.3 |
| IV | 80–84 | $CF_3COCCl_3$ | 16.9 |
| Residue | | $CF_2ClCOCCl_3$ | 22.2 |

*Example 2.*—Apparatus and catalyst were as in Example 1. Temperature in the reactor was maintained within the range of about 294–307° C. throughout the present run. During a period of about 2.7 hrs., about 520 g. (2.41 m.) of a feed consisting of vaporous $CF_2ClCOCFCl_2$ was metered into the reactor at a rate of about 194 g. (0.9 m.) per hour. Contact time was about 36 seconds. The reactor effluent was totally condensed as before, and about 468 g. of organic material were collected. The condensate was fractionally distilled, and weight composition of the organic products recovered was about as follows. Products were identified as above.

| Fraction | B.P., °C. Range | Constituent | Percent Yield |
|---|---|---|---|
| I | −27 to −20 | $CF_3COCF_3$ | 8.6 |
| II | 4–8 | $CF_3COCF_2Cl$ | 3.0 |
| III | 45–51 | $CF_3COCFCl_2$ | 10.0 |
| IV | 81–91 | $CF_3COCCl_3$ | 31.0 |
| V | 120–127 | $CF_2ClCOCCl_3$ | 21.5 |

*Example 3.*—Apparatus and catalyst were as in Example 1. Temperature in the reactor was maintained within the range of 284–296° C. During a period of about 1.3 hrs., about 240 g. (1.45 m.) of a feed consisting of vaporous $CF_3COCF_2Cl$ was metered into the reactor at a rate of about 199 g. (1.09 m.) per hour. Contact time was about 31 seconds. The reactor effluent was totally condensed as before, and about 240 g. of organic material were collected. The condensate was fractionally distilled, and weight composition of the organic products recovered was about as follows. Products were identified as above.

| Fraction | B.P., °C. Range | Constituent | Percent Yield |
|---|---|---|---|
| I | −25 to −24 | $CF_3COCF_3$ | 40.7 |
| II | 7–11 | $CF_3COCF_2Cl$ | 13.8 |
| III | 44–47 | $CF_3COCFCl_2$ | 10.2 |
| IV | 81–84 | $CF_3COCCl_3$ | 10.4 |

We claim:
1. The process which comprises contacting vaporous starting material—said starting material consisting of at least one perhalogenated acetone containing two to five fluorine atoms and wherein all halogens are selected from the group consisting of chlorine and fluorine—at disproportionation temperature substantially in the range of about 200° to about 500° C. with dichromium trioxide catalyst derived from hydrous chromic oxide formed by precipitation from a trivalent chromium salt solution and subjected to heat treatment substantially in the range of 300–400° C. for not less than about one hour, to effect formation of reaction product containing a mixture of $C_3OCl_{6-x}F_x$ compounds, where $x$ is an integer of from 1 to 6, at least one of said compounds having a fluorine content greater than that of any perhalogenated acetone in said starting material.

2. The process of claim 1 in which disproportionation temperature is substantially in the range of 225–400° C.

3. The process which comprises introducing into a reaction zone a charge consisting of vaporous starting material—said starting material consisting of at least one perhalogenated acetone containing two to five fluorine atoms and wherein all halogens are selected from the group consisting of chlorine and fluorine—heating said material in said zone at disproportionation temperature substantially in the range of 200–500° C. while in the presence of dichromium trioxide catalyst derived from hydrous chromic oxide formed by ammonia precipitation from a trivalent chromium salt solution and subjected to heat treatment substantially in the range of 300–400° C. for not less than about one hour, to effect formation of reaction product containing a mixture of $C_3OCl_{6-x}F_x$ compounds where $x$ is an integer of from 1 to 6, at least one of said compounds having a fluorine content greater than that of any perhalogenated acetone in said starting material, and discharging said reaction product from said zone.

4. The process of claim 3 in which disproportionation temperature is substantially in the range of 225–400° C.

5. The process for making perhaloacetone $C_3OCl_{6-x}F_x$ where $x$ is an integer from 5 to 6 which process comprises introducing into a reaction zone a charge consisting of vaporous starting material—said starting material consisting of at least one perhalogenated acetone containing three to four fluorine atoms and wherein all halogens are selected from the group consisting of chlorine and fluorine—heating said material in said zone at disproportionation temperature substantially in the range of 225–400° C. while in the presence of dichromium trioxide catalyst derived from hydrous chromic oxide formed by ammonia precipitation from a trivalent chromium salt solution and subjected to heat treatment substantially in the range of 300–400° C. for not less than about two hours, heating said material in said zone for a time sufficient to effect formation of reaction product containing a mixture of $C_3OCl_{6-x}F_x$ compounds, where $x$ is an integer of from 1 to 6, at least one of said compounds containing at least five fluorine atoms and having a fluorine content greater than that of any perhalogenated acetone in said starting material, and discharging said reaction product from said zone.

6. The process for making a reaction product containing $CF_3COCF_2Cl$ and $CF_3COCF_3$ which process comprises introducing into a reaction zone a charge consisting of vaporous starting material—said starting material consisting of at least one perhalogenated acetone containing three to four fluorine atoms and wherein all halogens are selected from the group consisting of chlorine and fluorine—heating said material in said zone at disproportionation temperature substantially in the range of 225–400° C. while in the presence of dichromium trioxide catalyst derived from hydrous chromic oxide formed by ammonia precipitation from a trivalent chromium salt solution and subjected to heat treatment substantially in the range of 300–400° C. for not less than about two hours, heating said material in said zone for a time sufficient to effect formation of reaction product containing $CF_3COCF_2Cl$ and $CF_3COCF_3$, discharging said reaction product from said zone, and separately recovering at least $CF_3COCF_3$.

7. The process of claim 6 in which contact time of reactants and catalyst is substantially in the range of 10–50 seconds.

References Cited in the file of this patent

UNITED STATES PATENTS

| | | |
|---|---|---|
| 2,426,637 | Murray | Sept. 7, 1947 |
| 2,694,739 | Pailthorp | Nov. 16, 1954 |

OTHER REFERENCES

Remy: Treatise on Inorganic Chemistry, vol. II, pp. 135–6 (1956).